May 9, 1950  E. WILDHABER  2,506,756
HYPOID GEARS

Filed Sept. 12, 1945  3 Sheets-Sheet 1

ERNEST WILDHABER
*INVENTOR.*

BY *B. E. Schlesinger*

May 9, 1950

E. WILDHABER 2,506,756

HYPOID GEARS

Filed Sept. 12, 1945

ERNEST WILDHABER
INVENTOR.

BY

May 9, 1950  E. WILDHABER  2,506,756
HYPOID GEARS
Filed Sept. 12, 1945  3 Sheets-Sheet 3

ERNEST WILDHABER
*INVENTOR.*
BY B.F. Schlesinger

Patented May 9, 1950

2,506,756

UNITED STATES PATENT OFFICE 2,506,756

HYPOID GEARS

Ernest Wildhaber, Brighton, N. Y., assignor to Gleason Works, Rochester, N. Y., a corporation of New York Application September 12, 1945, Serial No. 615,786

11 Claims. (Cl. 74—459.5)

The present invention relates to tapered gears which mesh with angularly disposed, offset axes, and specifically to hypoid gears in which one or both members of the pair have straight, oblique, that is, non-radial teeth. I have chosen to call these gears skew hypoid gears.

Longitudinally curved tooth hypoid gears have come into extensive use in recent years, being widely employed in the final drives of automotive vehicles and in many industrial installations, but gears, which mesh with angularly disposed, offset axes and which have straight teeth, have heretofore not reached the stage of practical development. For years, textbooks have contained treatises on bevel gears with straight, oblique teeth designed to mesh with offset, angularly disposed axes. These gears are called skew bevel gears. Some such gears have been made, but such gears have been used only rarely because they do not have the structure to mesh correctly and in practice no satisfactory method has been developed for cutting them. I have devised certain methods for cutting straight toothed tapered gears to mesh with offset, angularly disposed axes, which are correct, but these methods are slow as compared with the processes employed in the cutting of longitudinally curved tooth hypoid gears. The gears cut, moreover, by these methods have had certain drawbacks in design. For these reasons, the industry has preferred to use longitudinally curved tooth hypoids.

One object of the present invention is to provide tapered gears having longitudinally straight teeth which will run correctly when meshed with their axes offset and angularly disposed, and which will have the requisite strength, and be satisfactory in any ratio.

Another object of the invention is to provide tapered gears of the character described which may be produced in a high-production cutting process. To this end, it is the purpose of the invention to provide a new form for straight toothed tapered gears that are to mesh with offset axes which can be cut, by the process of my U. S. Patent No. 2,357,153, issued August 29, 1944. In this way both sides of a tooth space of a gear may be cut simultaneously in a milling operation for their full lengths with proper taper and proper change in profile shape from end to end.

A further object of the invention is to provide a cutter of suitable form for cutting gears according to this invention by the process of Patent No. 2,357,153 referred to above.

Other objects of the invention will be apparent hereinafter from the specification and from the recital of the appended claims.

Hypoid gears made according to the present invention have teeth on one or both members which are straight longitudinally and the teeth of at least one member are oblique, that is skew. The teeth of both members, unlike the teeth of longitudinally curved tooth hypoid gears, are of the same hand. In this, they resemble the skew bevel gears of the textbooks. They differ from skew bevels, however, in having unequal pressure angles on opposite sides of the teeth. The pressure angle of the tooth sides which face the gear axis, that is, which are toward the gear axis, is smaller than the pressure angle on the opposite sides of the teeth. This difference in pressure angle on the two sides of the teeth permits of making tooth profiles of the same curvature on opposite sides of the teeth, and which have sufficient duration of contact on both sides for smooth, continuous driving.

Figures 10, 11:
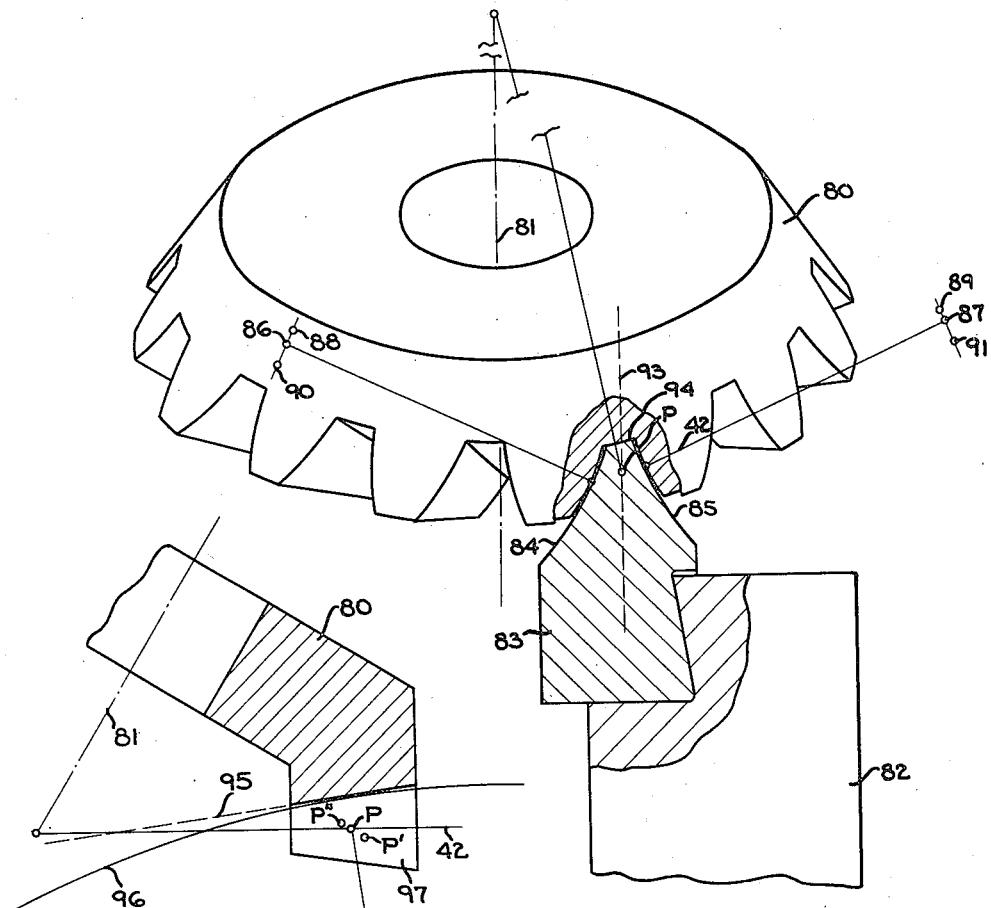

Fig. 10 is a diagrammatic view illustrating certain principles underlying the cutting of a skew hypoid gear according to this invention by the process of Patent No. 2,357,153; and Fig. 11 is a view taken at right angles to that of Fig. 10 and further illustrating not only the method of cutting skew hypoid gears according to this invention by the process of this patent, but also illustrating the novel form of cutter which may be employed with this invention for cutting skew hypoid gears by this process.

Figure 1:
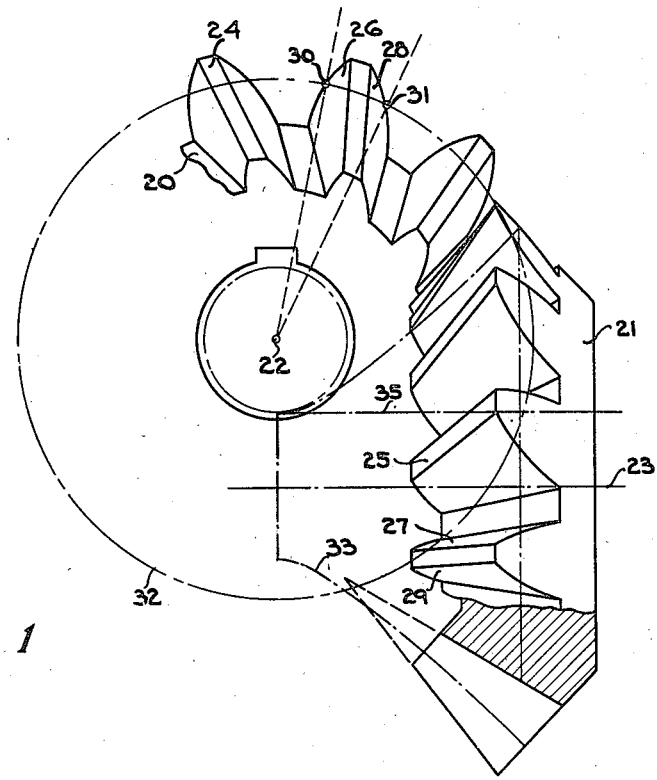
Fig. 1 is a fragmentary view of a pair of right angular skew hypoid gears made according to the invention, and showing somewhat diagrammatically certain features of construction of these gears.

In Fig. 1, 20 and 21 denote, respectively, the two members of a pair of skew hypoid gears which mesh with axes at right angles and which have equal numbers of teeth, and which can, therefore, be called skew hypoid mitre gears. The axes of these gears are denoted at 22 and 23, respectively. The teeth 24 and 25, respectively, of the two members are straight and oblique, that is, non-radial of the axes of the two members. The teeth of the two members are of the same hand, both gears being left hand in the instance shown. The two members 20 and 21 for skew hypoid mitre gears, may, therefore, be identical. Their hyperboloidal pitch surfaces are denoted at 32 and 33, respectively, and the instantaneous axis or line of contact of the pitch hyperboloids is denoted at 35.

In gears made according to the present invention, the teeth have unequal pressure angles on opposite sides, and I shall demonstrate that this is necessary in order to obtain proper mesh of longitudinally straight toothed tapered gears which run with offset axes. Inasmuch as a tooth of a skew hypoid gear bypasses the axis of the gear, the tooth has one side which is toward the axis and an opposite side which is away from the axis. In the gear 20 of Fig. 1, the sides 26 of the teeth, which are toward the gear axis 22, have a lower pressure angle than the opposite sides 28 of the teeth. Likewise, the sides 27 of the teeth of the gear 21, which are toward the axis 23, have a lower pressure angle than the sides 29 of the teeth of this gear. In both gears, moreover the pressure angle of the sides of the teeth, which are toward the gear axes, is less than the pressure angle of the teeth of a corresponding bevel gear, while the sides of the teeth away from the gear axes have a pressure angle greater than the pressure angle of a corresponding bevel gear.

It will be demonstrated hereinafter that when the pressure angles of straight tooth tapered gears, that mesh with offset axes, are made equal on the two sides, the two sides of the teeth, if made properly conjugate, have unequal profile curvatures, and the profile curvature on the sides of the teeth, which are remote from the gear axis, is like the profile curvature of a comparable bevel gear of lower pressure angle. In some cases of large offset of the gear axes and low pressure angles, this means that the gears become inoperative on the sides of the teeth remote from the gear axes on account of the extreme undercut of the tooth profiles and insufficient profile action. On the other side the duration of contact is unnecessarily reduced. If, on the other hand, equal pressure angles and symmetrical profiles are provided on the two sides of the teeth, as shown in most textbooks, then the gears are not properly conjugate and do not transmit uniform motion.

It will be further demonstrated that by providing unequal pressure angles on the two sides of the teeth, the profile curvatures of the two sides of the teeth can be balanced, that is, can be made equal. It will further be shown how much unbalance or inequality in the pressure angle is required on the two tooth sides to obtain equal tooth profile curvatures on opposite sides of the teeth.

The difference of the pressure angles on the two sides of the teeth of gears made according to the present invention causes the teeth to lean. Thus, the side 26 of a tooth 24 of gear 20 has a smaller inclination to a plane 22—30 containing the gear axis 22 and passing through pitch point 30, as compared with the inclination of the opposite side 28 of the tooth with reference to a radial plane 22—31. The tooth 24 appears to lean to the left, and inasmuch as the tooth when extended passes to the right of the gear axis 22, it can be considered as leaning toward the gear axis.

In a sense, the teeth of gears made according to this invention might be considered as buttressed teeth, but here there is no purpose of buttressing the teeth to add streigth at the expense of profile balance. Here the lean of the teeth is in a definite direction and is a definite amount, and is for the purpose of achieving balance of the tooth profiles on the two sides of the teeth and equal freedom from undercut on both sides.

The textbooks insist that in a skew hypoid gear not only should the pressure angles be equal on the two sides of the teeth but also that the pressure angles should stay constant along the whole length of the teeth with respect to the theoretical hyperbolic pitch surface of the gear. The tooth surfaces proposed by the textbooks for skew bevel gears are therefore surfaces which are warped longitudinally.

In my United States Patent No. 1,676,419, issued July 10, 1928, I have shown skew hypoid gears with tooth surfaces that are not warped. These gears have, however, the same pressure angles on opposite sides of the teeth and the profile curvatures are different on opposite sides. In this patent, however, I have demonstrated that hypoid gears can be generated conjugate to basic helicoids which mesh with the gear and the mating pinion along the same lines in all positions of rotation as the gear and pinion mesh with one another. In this patent, also, I proposed that the basic helicoids used in generation have plane tooth sides. In such case the resultant tooth surfaces of the gear would not be warped. As I shall prove hereinafter, such surfaces are preferable in their action to warped tooth surfaces, and I shall use some of the principle set forth in Patent No. 1,676,419 to explain how the gears of my present invention may be produced which have different pressure angles, but the same profile curvature, on opposite sides of the teeth. Moreover, the problem of producing oblique teeth on tapered gears that are to mesh with offset axes will be reduced to the well known problem of tooth shape on bevel gears with intersecting axes. It is this which opens up new methods of production prominent among which is the process of Patent No. 2,357,153.

Figure 3:
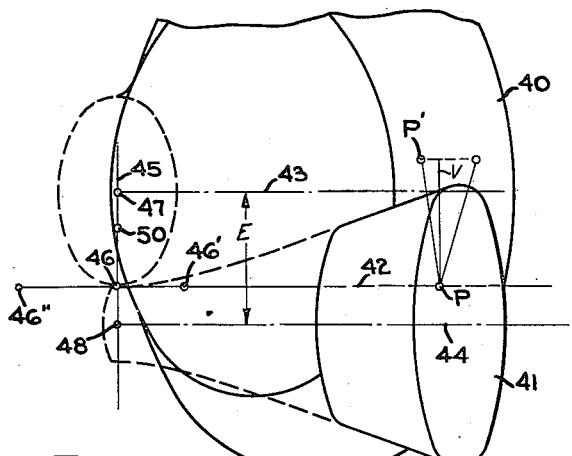
Figs. 3 and 4 are diagrammatic views taken at right angles to one another showing the pitch surfaces of a pair of skew hypoid gears whose axes are inclined to one another at less than a right angle, and illustrating broadly certain principles on which hypoid gears of any shaft angle may be constructed according to this invention.
Figure 4:
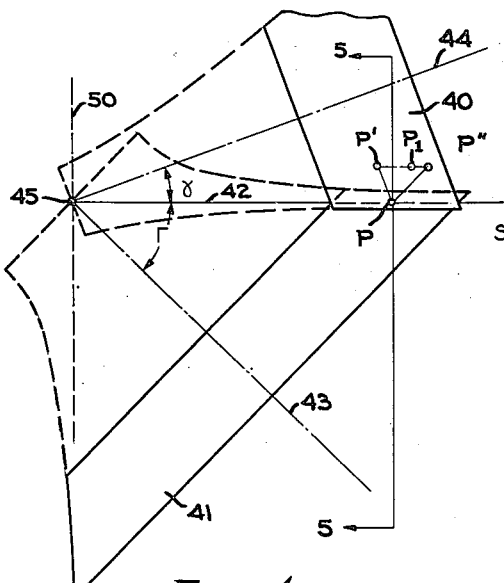

Figs. 3 and 4 show a pair of contacting pitch hyperboloids 40 and 41 which may be considered as the pitch surfaces of a pair of angular hypoid gears made according to this invention. Both views are taken at right angles to the straight line 42 of contact between the pitch hyperboloids, which is the instantaneous axis of mesh of the gears. The axis of the gear or larger member of the pair is denoted 43, and the axis of pinion or smaller member of the pair is designated 44. The axes 43 and 44 are offset from one another a distance E and they are inclined to the instantaneous axis 42 at angles $\Gamma$ and $\gamma$, respectively. The angle $\Sigma$ between the axes themselves, which is equal to $\Gamma+\gamma$ is in the instance shown different from a right angle, to obtain the most general solution for our problem. The axes 42, 43, and 44 are all perpendicular to the line 45 (Fig. 3) and intersect that line in the points 46, 47, and 48, respectively. This line 45 is the shortest connecting line between the axes.

Pitch angles, $\gamma$ and $\Gamma$ are determined from the ratio of the tooth numbers of the two gears, as though the gears were bevel gears with intersecting axes. The distance 46—47 between the instantaneous axis 42 and the gear axis 43, which is denoted by Z', is:

$$Z' = \frac{E \tan \Gamma}{\tan \gamma + \tan \Gamma}$$

as can be determined from my Patent No. 1,676,419 and particularly from Formula 2 thereof, using the present symbols. Likewise, the distance Z'', which is the distance 46—48, between the instantaneous axis 42 and the pinion axis 44, is:

$$Z'' = \frac{E \tan \gamma}{\tan \gamma + \tan \Gamma}$$

As is demonstrated in my Patent No. 1,676,419, there are an infinite number of helicoidal segments conjugate to a hypoid gear pair, but from this infinite number we shall single out for consideration here the one whose axis 50 is perpendicular to the direction of the instantaneous axis 42. Distance 46—50 (Fig. 3) is then equal to the distance 46—47 minus distance 46—48, according to Formula 4 of Patent No. 1,676,419, if the angle $a°$, the angle between the instantaneous axis 42 and the axis 50 of the basic helicoidal member, is equal to 90°, $\sin a° = 1$ and $\tan a° = \infty$. The distance 47—50 is then equal to distance 46—48, that is to Z''.

The lead L° of this helicoid is:

$$L° = 2\pi \frac{Z'}{\tan \Gamma} = 2\pi \frac{Z''}{\tan \gamma}$$
$$= 2\pi \frac{E}{\tan \gamma + \tan \Gamma}$$

from Formula 5 of Patent No. 1,676,419.

We shall now analyze the conditions of mesh at the two sides of the teeth at any point P of the instantaneous axis, that is, at any pitch point. Ordinarily, the instantaneous axis of skew bevel gears is a line of the contacting tooth surfaces in a given position of rotation of the gears. A tooth normal at point P is perpendicular to the instantaneous axis 42 and is contained in the plane 5—5 of Fig. 4. One possible tooth normal is particularly interesting. This normal shall be called the limit normal. Thus, if we imagine a unit force acting along the limit normal at point P, this force will exert torque on the gear and pinion in the proportion of their respective numbers of teeth. When this normal is turned about the axis of either gear or pinion an infinitesimal amount, a unit force acting along it will, of course, continue to exert the same torque about the axis about which it is turned, but it will also continue to exert the same torque as at P about the axis of the other member of the gear pair when extending along the limit normal. A normal to the instantaneous axis 42 in any other direction gives an increased or a reduced torque at slightly different positions of rotation of the gear. There is a finite rate of change of the torque. The limit normal, however, has zero rate of change at the considered point P.

If a pressure angle corresponding to the inclination of the limit normal, that is, equal to the limit pressure angle were to be provided at point P, it would mean that this point would tend to stay in contact as the gears rotated together. In other words, the surface of action would then tend not to cross the pitch surface but to be tangent to it at P, and this would not give good tooth action. The limit pressure angle is, therefore, a pressure angle to avoid in practice just as zero pressure angle is avoided on bevel and spur gears.

Figure 5:
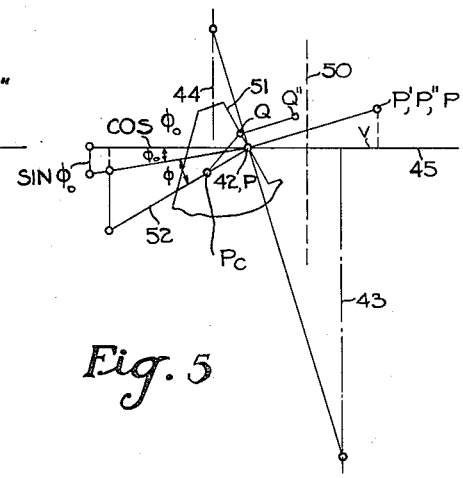
Fig. 5 is a diagrammatic view, which might be considered as taken in a plane perpendicular to the instantaneous axis of mesh of the gears, and along the line 5—5 of Fig. 4.

Let us now consider the inclination of the tooth normal with respect to the plane which contains the instantaneous axis 42 and the line 45. Let $\phi_0$ denote the inclination of the limit normal to said plane, or the limit inclination. A unit force acting along said limit normal can be resolved into a horizontal component $\cos \phi_0$ (Fig. 5) and into a vertical component $\sin \phi_0$.

During an infinitesimal turning movement about the pinion axis, the point P reaches a position P', which is shown very much exaggerated. The distance PP' can also be resolved into two components, namely, into a horizontal component V perpendicular to line 42, and into a component appearing as PP' in Fig. 4. If A denotes the distance P—46 of point P from line 45, the infinitesimal turning angle about the pinion axis can be put down as:

$$\frac{V}{A \sin \gamma}$$

measured in radians; and projection PP', as appearing in Fig. 4, as:

$$Z'' \cdot \frac{V}{A \sin \gamma}$$

We shall now determine the increment of the turning moment $\Delta M$ exerted on the gear by a unit force extending along the limit normal in its new position P'. This increment over the turning moment at position P can be obtained as the sum of two increments due to linear and angular components. One is the moment obtained by turning the force about an axis parallel to the pinion axis and passing through the point P. The other is the moment obtained by shifting the force parallel to itself from P to P'. They are:

$$\cos \phi_0 \cdot \frac{V}{A \sin \gamma} \cdot \cos (\gamma + \Gamma) \cdot Z' - \sin \phi_0 \cdot \frac{V}{A \tan \gamma} \cdot A \sin \Gamma$$

and:

$$\cos \phi_0 \cdot \frac{V}{A \sin \gamma} \cdot \cos (\gamma + \Gamma) \cdot Z'' - \sin \phi_0 \cdot V \cdot \cos \Gamma$$

respectively, as can be demonstrated with the known methods of mathematics. This increment must be zero for the limit normal. Hence:

$$\cos \phi_0 \cdot \frac{V}{A \sin \gamma} \cdot \cos (\gamma + \Gamma) \cdot (Z' + Z'')$$
$$= \sin \phi_0 \cdot \frac{V[\sin \Gamma \cos \gamma + \cos \Gamma \sin \gamma]}{\sin \gamma}$$
$$= \sin \phi_0 \cdot \frac{V \cdot \sin (\Gamma + \gamma)}{\sin \gamma}$$

Through transformation, we obtain:

$$\tan \phi_0 = \frac{E}{A} \cdot \operatorname{ctn} (\gamma + \Gamma) = \frac{E}{A} \cdot \operatorname{ctn} \Sigma \qquad (1)$$

Where the shafts of the gears are at right angles to one another, $\Sigma$ is equal to 90°, and the above formula becomes:

$$\tan \phi_0 = 0; \quad \phi_0 = 0 \qquad (1a)$$

In this case, the limit normals of all points P of the instantaneous axis are all located in a plane containing line 42—45, which can therefore be called a limit plane.

Figure 6:
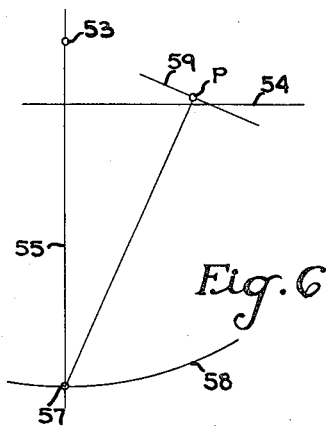
Fig. 6 is a diagrammatic view of a right angular hypoid drive taken looking along the gear or pinion axis.

The case of gears, which mesh with their axes at right angles, will now be considered. For this purpose, reference will be had to Fig. 6. Here the gear axis is denoted at 53 and the pinion axis at 54. The pinion axis lies in the plane of the drawing. 59 denotes the direction of a tooth of the gear. It is so determined that it extends in the direction of relative sliding between the mating teeth. The limit normal at point P is in a plane perpendicular to the direction of the tooth and intersects the line 55 which is perpendicular to the axes of both the gear and pinion and is the shortest line connecting these two axes.

Let us consider a unit force acting along the limit normal. It passes through the intersection point 57 of the tooth normal with line 45 and can be resolved into two components at said point. One of these components lies in the plane of the drawing and is the normal projection of the force vector to the drawing plane. Inasmuch as the drawing plane contains the pinion axis, this component intersects the pinion axis and exerts no turning movement on the pinion. The other force component is perpendicular to the drawing plane and exerts a force on the pinion proportional to its distance from the pinion axis 54, that is, proportional to the distance of intersection point 57 from the pinion axis 54.

When the limit normal and the force extending along it are turned about the gear axis 53, the intersection point 57 of the normal with the drawing plane describes a circle 58 which is centered at 53. The tangent to this circle at point 57 is parallel to the pinion axis. For an infinitesimal turning motion about the gear axis, the distance of said intersection point from the pinion axis has a zero rate of change, and the moment exerted on the pinion by said unit force also has a zero rate of change. This proves that the line P—47 is a limit normal, and that a limit normal intersects the line 45 which passes through both axes and is perpendicular thereto.

In the case illustrated in Fig. 4, the limit normal, like all normals at point P, is contained in the plane of line 5—5 which is perpendicular to instantaneous axis 42 and therefore parallel to line 45. The one straight line of this plane which contains point P and intersects line 45 in the mathematical sense is the line drawn through point P parallel to line 45. The intersection point is then at an infinite distance from point P. Hence $\phi_0$ is equal to zero, as given in Formula 1a.

The profile curvature at any point P will now be determined. It is measured in a plane section perpendicular to the instantaneous axis. We shall first consider pinion and gear tooth surfaces conjugate to the basic helicoidal member whose axis is at 50 perpendicular to instantaneous axis 42 and whose teeth have plane side tooth surfaces. 51 (Fig. 5) denotes one side of a tooth of such a basic helicoidal member. 52 denotes the normal to the tooth side at point P. It has an inclination $\phi$ with respect to the plane containing the instantaneous axis 24 and straight line 45. A unit force extending along this normal can be resolved into a component extending along the limit normal and into a component perpendicular to the said plane which may be called the virtual pitch plane. The latter component is:

$$\cos \phi (\tan \phi - \tan \phi_0)$$

For an infinitesimal movement of the basic helicoid, the force component along the limit normal produces no change of the torque exerted on the pinion or of the torque exerted on the gear. The limit normal, in other words, is tied up with zero inclination of the surface of action, which is common to the pinion, gear, and basic helicoid. The limit normal determined for the pinion and the gear is also the limit normal for the basic helicoid and the pinion, and also for the mesh between the basic helicoid and the gear.

The other component, namely, $\cos \phi$ ($\tan \phi - \tan \phi_0$) gives a change of moment after said infinitesimal movement. It is $dM_P$ on the pinion and $dM_G$ on the gear. These can readily be computed as:

$$dM_P = V \cdot \cos \phi (\tan \phi - \tan \phi_0) \cos \gamma$$

and $$dM_G = -V \cdot \cos \phi (\tan \phi - \tan \phi_0) \cos \Gamma$$

when V denotes as previously the displacement component of point P along line 45. In the infinitesimal movement of the basic helicoid, point P of the helicoid moves to position $P_1$. Component V is the projection of $PP_1$ to direction 45.

Considering the point Q of the plane tooth side 51, which like component P is located in the plane 5—5 of Fig. 4 and is infinitely close to P, we note that a unit force acting along its normal produces the same moment and the same axial component on the basic helicoid as the unit force acting along the normal at P. It exerts however a smaller moment on the pinion and a larger moment on the gear. If $d_1$ denotes distance PQ, the increment moment exerted on the pinion and gear is:

$$dM'_P = -d_1 \cos \gamma$$

and $$dM'_G = d_1 \cos \Gamma$$

The negative sign above denotes a decrease in moment.

The increment moments $dM_P$ and $dM_G$ determined for the point P also apply to the infinitely close point Q. To find the position of contact of point Q we simply move the helicoid until the resultant increment in moment is zero, inasmuch as unit forces at P and Q exert the same moment and axial thrust on the helicoidal member.

Broadly, a point of contact is characterized by the feature that a unit force acting along its normal produces the same work on both contacting members when said members move an infinitesimal amount at the required ratio, which on complete gears themselves is the inverse ratio of their tooth numbers. Thus:

$$dM_P + dM_P' = 0$$
$$dM_G + dM_G' = 0$$

$$V \cdot \cos \phi (\tan \phi - \tan \phi_0) \cdot \cos \gamma - d_1 \cos \gamma = 0$$
$$-V \cdot \cos \phi (\tan \phi - \tan \phi_0) \cdot \cos \Gamma + d_1 \cos \Gamma = 0$$

Hence:

$$\frac{d_1}{V} = \cos \phi (\tan \phi - \tan \phi_0) \text{ in both cases.}$$

When the point Q becomes a point of contact, it will have assumed a position Q''. The inclination of its normal to the virtual pitch plane is the same as at Q and at P. Let us now turn back point Q'' to the original position of the tooth surfaces. When contact point Q'' is turned about the pinion axis to the original position of the pinion tooth surface, it will come into a position outside of the plane 5—5 of Fig. 4 which however is projected to point Q in the view of Fig. 5 within the distances considered.

For the purpose of determining the profile curvature radius of a straight tooth, it can be considered as coinciding with the point Q. The turning motion about the pinion axis changes the inclination of the tooth normal with respect to the virtual pitch plane and to line PQ. This inclination is reduced by $$\frac{V}{A \tan \gamma}$$

which is the product of the turning angle $$\frac{V}{A \sin \gamma}$$

about the pinion axis, and $\cos \gamma$. Thus the normal at point Q of the pinion profile appears inclined to the normal at P at said angle $$\frac{V}{A \tan \gamma}$$

The curvature radius of the pinion profile at P is, therefore, $$R_p = PP_c = \frac{d_1}{\frac{V}{A \tan \gamma}} = \frac{d_1}{V} \cdot A \tan \gamma$$

Using the previously found expression for $$\frac{d_1}{V}$$

the profile curvature radius $R_p$ of the pinion becomes:

$$\begin{aligned} R_p &= \cos \phi \, (\tan \phi - \tan \phi_0) \cdot A \tan \gamma \\ R_G &= \cos \phi \, (\tan \phi - \tan \phi_0) \cdot A \tan \Gamma \end{aligned} \quad (2)$$

Here $R_G$ denotes the curvature radius of the gear profile which is arrived at in like manner. These formulas can also be written as:

$$\begin{aligned} R_p &= \frac{\sin (\phi - \phi_0)}{\cos \phi_0} \cdot A \tan \gamma \\ R_G &= \frac{\sin (\phi - \phi_0)}{\cos \phi_0} \cdot A \tan \Gamma \end{aligned} \quad (2a)$$

These formulas apply to both sides of the teeth when the angle $\phi$ in introduced as a negative quantity for the opposite side. Where the axes of the gears are at right angles to one another, that is, where $\phi_0 = 0$, we obtain:

$$\begin{aligned} R_p &= \sin \phi \cdot A \cdot \tan \gamma \\ R_G &= \sin \phi \cdot A \cdot \tan \Gamma \end{aligned} \quad (2b)$$

These are exactly the same formulas as for the radii of curvature of the tooth sides of bevel gears which have intersecting axes and which are conjugate to basic crown gears having plane side tooth surfaces. The corresponding bevel gears would have their common apex at point 46 in the intersection of the instantaneous axis 42 with line 45, and their axes would be parallel to axes 44 and 43, and their pitch angles would be equal to $\gamma$ and $\Gamma$, respectively.

In bevel gears, as in spur gears, it is possible to add profile curvature to one member of the gear pair and subtract it from the other member so that the relative curvature at the pitch point stays the same. It can be demonstrated mathematically that this is true also on skew hypoid gears having teeth extending along the instantaneous axis. In other words, the radii $R_p'$ $R_G'$ of profile curvature can be determined from the above radii of curvature $R_p$ and $R_G$ as follows:

$$\frac{1}{R_p'} = \frac{1}{R_p} - C$$

and $$\frac{1}{R_G'} = \frac{1}{R_G} + C$$

where $C$ denotes any suitable constant.

The above derivations are exact as far as pressure angle and radii of curvature are concerned. The description of the tooth shape of skew hypoid gears on the basis of pressure angle and radii of curvature is like Tredgold's approximation for bevel gears. Tredgold reduced the bevel gear problem to a spur gear problem. I have reduced the problem of skew hypoids having straight teeth extending along the instantaneous axis to the known problem of straight bevel gears.

Formula 2 can be transformed by introducing the value for $\tan \phi_0$ given in Formula 1 to:

$$\begin{aligned} R_p &= A \tan \gamma \left( \sin \phi - \frac{E}{A} \cdot \text{ctn} \sum \cdot \cos \phi \right) \\ &= \tan \gamma \, (A \sin \phi - E \cdot \text{ctn} \sum \cdot \cos \phi) \\ &= \tan \gamma \cdot \sin \phi \, (A + \Delta A) \end{aligned}$$

where:

$$\Delta A \sin \phi = -E \cdot \text{ctn} \sum \cdot \cos \phi$$

Hence:

$$\Delta A = -\frac{E}{\tan \sum \cdot \tan \phi} = -E \cdot \text{ctn} \sum \cdot \text{ctn} \phi \quad (3)$$

This equation applies also to the gear.

This means that skew hypoid gears whose axes are inclined to one another at other than right angles can also be treated like angular bevel gears whose mean cone distance is:

$$A + \Delta A$$

The tooth side facing the axes of rotation, such as 26 and 27 of gears shown in Fig. 1, is like the tooth surface of a bevel gear or pinion whose pitch angle is $\Gamma$ or $\gamma$ and whose axes intersect, not at point 46, but another point 46' (Fig. 3) lying on the instantaneous axis 42. The tooth sides remote from the axis of rotation are like the tooth sides 28 and 29, which are remote from the gear axes and are likewise to be treated like tooth surfaces of mating bevel gears having pitch angles $\Gamma$ and $\gamma$, respectively, whose axes intersect in a point 46'' lying on the instantaneous axis 42. The distances 46—46' and 46—46'' are equal and opposite if the inclinations, that is, the inclination angles $\phi$ are equal and opposite on the two sides of the teeth. They are shown in Figs. 3 and 4 for a case where the axes of the gears are inclined to one another at an acute angle. Were the axes of the gears to be inclined to one another at an obtuse angle, the condition would be reversed and in Formula 3 the term $\text{ctn} \sum$ would then become negative.

In the case of skew hypoids, which mesh with their axes either at an acute or an obtuse angle, the inclinations $\phi$ are preferably made unequal numerically on the opposite sides of the teeth to equalize the profile curvatures on the two sides of the teeth. Where the axes of the pair of gears are at right angles to one another, the inclinations $\phi$ are preferably made numerically equal on the opposite sides of the teeth to obtain the equal profile curvatures desired.

Figure 2:
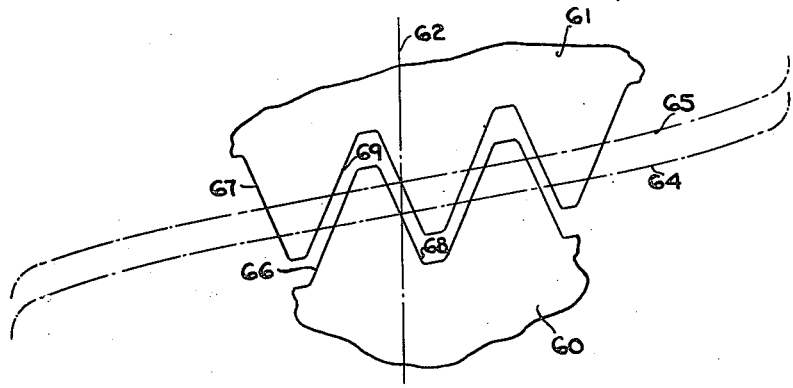
Fig. 2 is a diagrammatic view showing the basic helicoids to which the two gears of Fig. 1 are conjugate.

Fig. 2 shows two basic helicoids 60 and 61 which may be used in accordance with the present invention in the generation of skew hypoids with axes at right angles, such as the gears 20 and 21 of Fig. 1. These two gears will be fully conjugate to each other when they are generated conjugate to basic helicoidal members 60 and 61, respectively, which are supplemental to each other, that is, which are exact counterparts of one another. In Fig. 2, for the sake of clearness in illustration the helicoids are shown somewhat separated. These helicoids have an axis 62 and helical pitch surfaces 64 and 65, respectively. Opposite sides 66 and 68 of the teeth of the member 60 are plane surfaces equally inclined to the axis 62 but unequally inclined to the pitch line 64. Likewise, opposite sides 67 and 69 of the tooth surfaces of the member 61 are plane surfaces equally inclined to the axis 62 but unequally inclined to the pitch line 65. This is how the tooth surfaces should be inclined for production of correct skew hypoid gears. The basic helicoidal members heretofore used for generation of skew hypoid gears have had their tooth profiles inclined equally with respect to their pitch lines and inclined unequally with respect to their axes.

Figure 7:
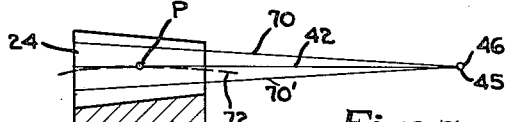
Fig. 7 is a view illustrating diagrammatically the tooth structure of a right angular hypoid gear which is conjugate to one of the basic helicoids of Fig. 2.

The tooth surfaces produced from a basic helicoid having plane tooth sides, such as shown in Fig. 2, are composed of straight line elements, such as 70 and 70' (Fig. 7) which converge toward an apex 46 located on line 45. When the process of my Patent No. 2,357,153 is employed in the production of the gears, however, the tooth surfaces are modified somewhat, as fully explained in my patent. The sides of the teeth of the gear will contact with a plane tangent to a tooth surface at mean point P in a curve 72 which is concave toward the bottom of the tooth space rather than in a straight line 42.

Figure 8:
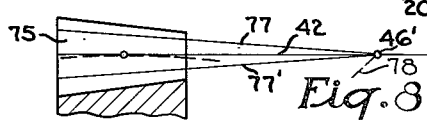
Figs. 8 and 9 are corresponding views of opposite sides of the teeth of a skew hypoid gear conjugate to a basic helicoid and adapted to mesh at other than right angles with its mate.
Figure 9:
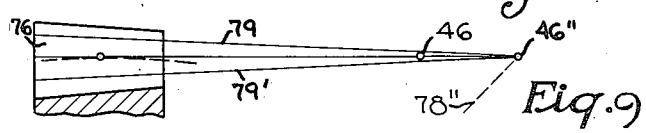

Figs. 8 and 9 show the conditions which prevail where the gears have axes inclined to one another at other than right angles, such as the gears illustrated diagrammatically in Figs. 3 and 4. Fig. 8 shows the side 75 of a tooth which faces the gear axis when the angle between the axes of the gears is less than 90 degrees, that is, is an acute angle. Fig. 9 refers to the opposite side 76 of the teeth in such a pair of gears. The straight line elements 77 and 77' of the tooth surface shown in Fig. 8 converge to a point 46' on the instantaneous axis 42. 78 is the axis of a bevel gear which has equivalent tooth surfaces. The straight line elements 79 and 79' shown in Fig. 9 converge to a point 46". 78" is the axis of the bevel gear with equivalent tooth surfaces. Where the shaft angle between the axes of the two mating gears is an obtuse angle, the conditions are reversed from the conditions shown in Figs. 8 and 9. Fig. 9 would illustrate a condition, then, for the sides of the teeth which face the gear axis and Fig. 8 would illustrate the condition for the sides of the teeth which are remote from the gear axis.

Figs. 10 and 11 illustrate diagrammatically how one member 80 of a right angle skew hypoid drive constructed according to this invention can be cut by the process of my Patent No. 2,357,153. The axis of this member is denoted at 81. Here a cutter 82 is employed which has a plurality of cutting blades 83 arranged part-way around its periphery. Each of the blades may have side-cutting edges 84 and 85 at opposite sides or, alternately, successive blades may be sharpened to cut, respectively, on the opposite sides of a tooth space. The side-cutting edges of the blades are of circular arcuate shape and the centers of curvature of the corresponding side-cutting edges of successive blades are displaced from one another progressively both radially and axially of the cutter, that is, these centers of curvature are arranged in a three-dimensional spiral about the axis of the cutter. Thus, as shown in Fig. 11, the center of the side-cutting edge 84 of blade 83 may be at 86 and the centers of curvature of other side-cutting edges cutting on the same side of the tooth space may be at 88 and 90, respectively, while the center of the side-cutting edge 85 of blade 83 may be at 87, and the centers of curvature of other side-cutting edges, which cut at the same side of the tooth space as the side-cutting edge 85, may be at 89 and 91. The cutting surfaces, which contain the side-cutting edges of the blades, are alike on the two sides of the cutter, but they have different positions radially of the cutter and are displaced angularly with reference to one another about the axis of the cutter. The result is, that instead of the blade 83 being symmetrical with reference to a line 93 bisecting the blade, that is, to a plane perpendicular to the cutter axis 92 the sides 84 and 85 are unsymmetrical with reference to that line. Further than this, the tip-cutting edges 94 of the blades are inclined to the axis 92 of the cutter, not parallel to it. This enables them to cut the proper root surface in each tooth space of the blank despite the oblique, skew movement of the tool across the face of the blank in the cutting of the blank. For cutting gears, which have their axes at other than right angles, different cutting surfaces are required on the two sides of the cutter.

In operation, the cutter is rotated on its axis 92 and then fed, preferably at a uniform rate, along the root line 95 of the work. Preferably, as is usual with cutters employed in the process of my Patent No. 2,357,153, there are several blades in the cutter which are roughing blades and these are followed by finishing blades, and there is a gap between the last finishing blade and the first roughing blade. The cutter is fed in one direction along the root line of the work to rough out a tooth space of the work, and then fed in the opposite direction to finish that tooth space. Then, when the gap of the cutter is abreast of the work, the work is indexed. Then the lengthwise feed movement begins anew.

In Fig. 10, the arc 96 denotes the position of the tip surface of the cutter at a mean point along the length of the tooth when the axis of the cutter is at 92'. With the cutter described and operating in the manner described, the two sides of the teeth of the work will be equally inclined with respect to the central plane 93 of the cutter but they will be displaced depthwise and longitudinally with respect to one another. P' and P" denote the points on the opposite sides of the two teeth, which correspond to mean point P.

While the invention has been described in connection with the production of gears in which both members of the pair have oblique teeth, it is to be understood that broadly it covers all skew hypoid gears in which the gear member, that is, the member of the gear pair having the larger number of teeth, is of the same hand as its mate or in the limit case has radial teeth.

Further than this, it may be said that while the invention has been described in connection with particular embodiments thereof, it is to be understood that the invention is capable of further modification, and that this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A tapered gear having straight, non-radial teeth whose opposite sides are unequally inclined to its pitch surface and equally inclined to the direction of its axis.

2. A tapered gear having straight, non-radial teeth whose opposite sides are unequally inclined to its pitch surface and equally inclined to the direction of its axis, and contact mean tangent planes along lines that are concave toward the bottoms of the tooth sides.

3. A pair of tapered gears which have different tooth numbers and which mesh with angularly disposed, offset axes, both of which have longitudinally straight, non-radial teeth which extend in the direction of the instantaneous axis of the gears, opposite sides of the teeth of each gear having different pressure angles, the sides of the teeth of each gear, which are toward the axis of that gear, having the lower pressure angle.

4. A pair of tapered gears with different tooth numbers which mesh with angularly disposed, offset axes, both of which have longitudinally straight, non-radial teeth which extend in the direction of the instantaneous axis of mesh of the gears, the teeth of both gears being of the same hand, and opposite sides of the teeth of each gear having different pressure angles.

5. A pair of tapered gears which mesh with angularly disposed, offset axes, both of which have longitudinally straight, non-radial teeth which extend in the direction of the instantaneous axis of mesh of the gears, the teeth of both gears being of the same hand, and opposite sides of the teeth of each gear having different pressure angles but equal profile curvatures.

6. A pair of tapered gears which mesh with angularly disposed, offset axes and which are conjugate to basic helicoids whose opposite side tooth surfaces are planes equally inclined to their axes and that are exact counterparts of one another.

7. A pair of tapered gears which mesh with angularly disposed, offset axes, both of which have longitudinally straight, non-radial teeth, the teeth of each gear having opposite sides which are of unequal inclination to the pitch surface of the gear but of equal inclination with respect to a plane containing the instantaneous axis of mesh of the gears and a line perpendicular to the axes of both gears.

8. A pair of tapered gears which mesh with angularly disposed, offset axes and which have longitudinally straight, non-radial teeth extending in the direction of the instantaneous axis of the gears, the teeth of each gear having opposite sides which are of unequal inclination to the pitch surface of the gear but of equal inclination with respect to a plane containing the instantaneous axis and a line perpendicular to the axes of both gears.

9. A pair of tapered gears which mesh with angularly disposed, offset axes and which have longitudinally straight, non-radial teeth, one member of the pair at least having tooth sides which contact with mean tangent planes along lines that are concave toward the bottoms of the tooth sides.

10. A pair of tapered gears which mesh with angularly disposed, offset axes and which have longitudinally straight, non-radial teeth, one member of the pair having opposite side tooth surfaces which contact with means tangent planes along lines that are concave toward the bottoms of the teeth.

11. A pair of tapered gears which mesh with angularly disposed, offset axes and which have longitudinally straight, non-radial teeth, both members of the pair having side tooth surfaces which contact with mean tangent planes along lines concave toward the tooth bottom.

ERNEST WILDHABER.

REFERENCES CITED

The following references are of record in the file of this patent:

UNITED STATES PATENTS

| Number | Name | Date |
| --- | --- | --- |
| 1,112,509 | Williams | Oct. 6, 1914 |
| 1,676,419 | Wildhaber | July 10, 1928 |
| 2,392,278 | Wildhaber | Jan. 1, 1946 |